Feb. 8, 1944.  G. WÜNSCH  2,341,257
FUEL FEEDING DEVICE FOR INTERNAL COMBUSTION ENGINES
Filed Dec. 5, 1938  6 Sheets-Sheet 1
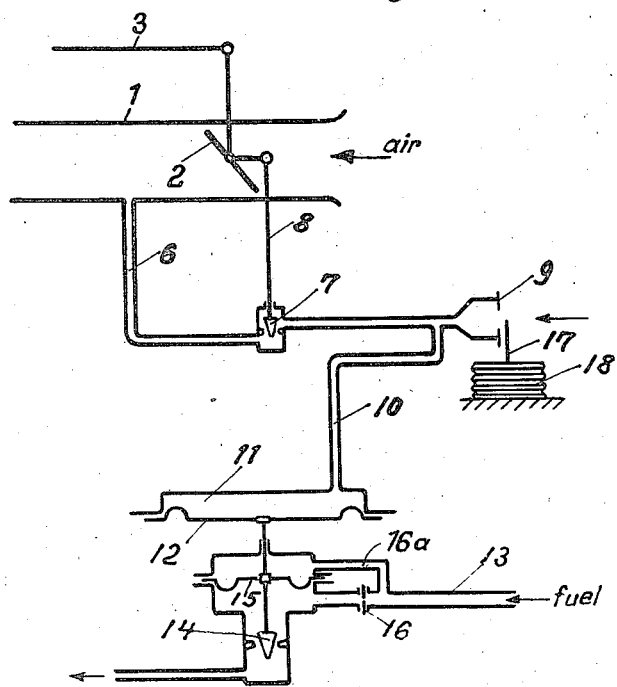
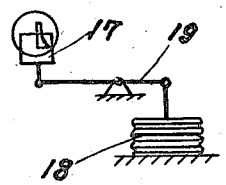
Inventor:
G. Wunsch
By A. D. Adams
Attorney

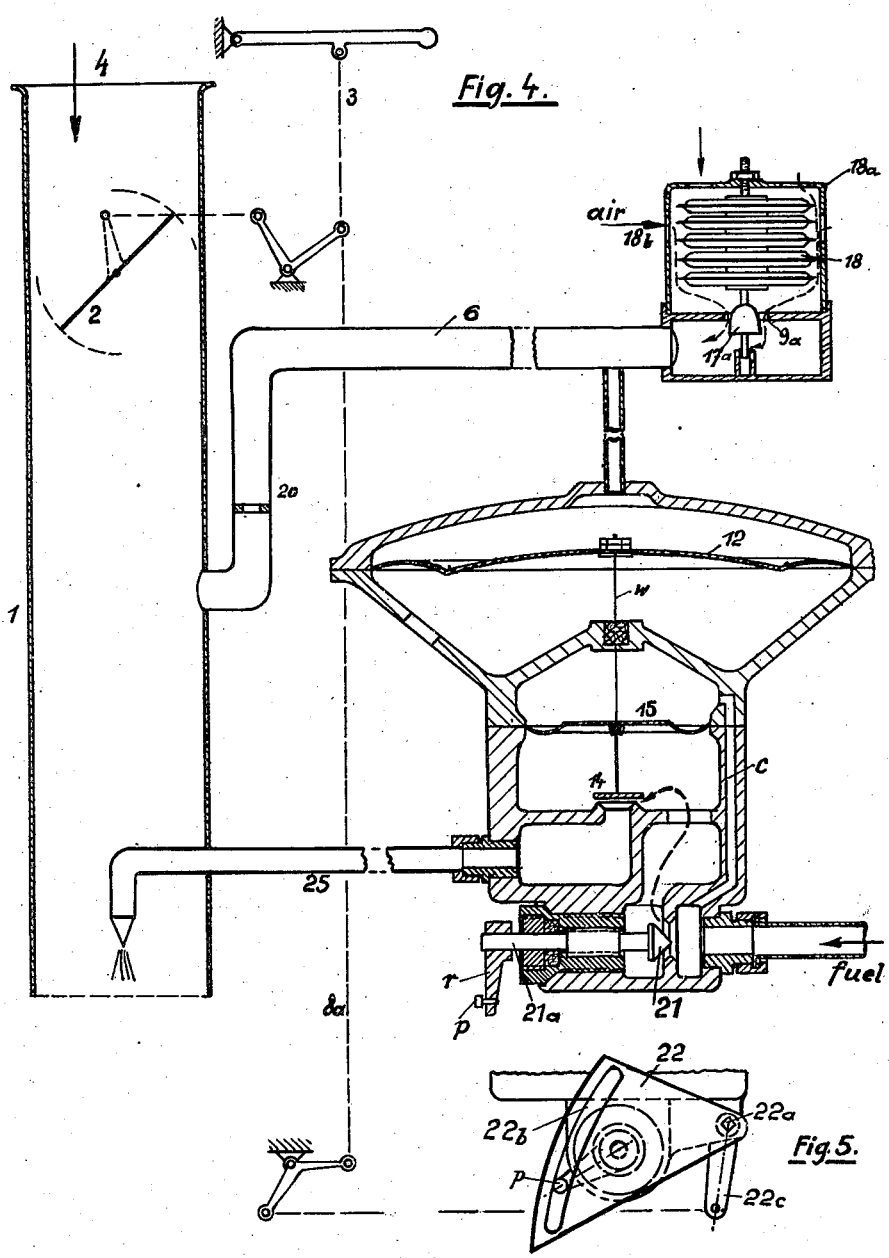

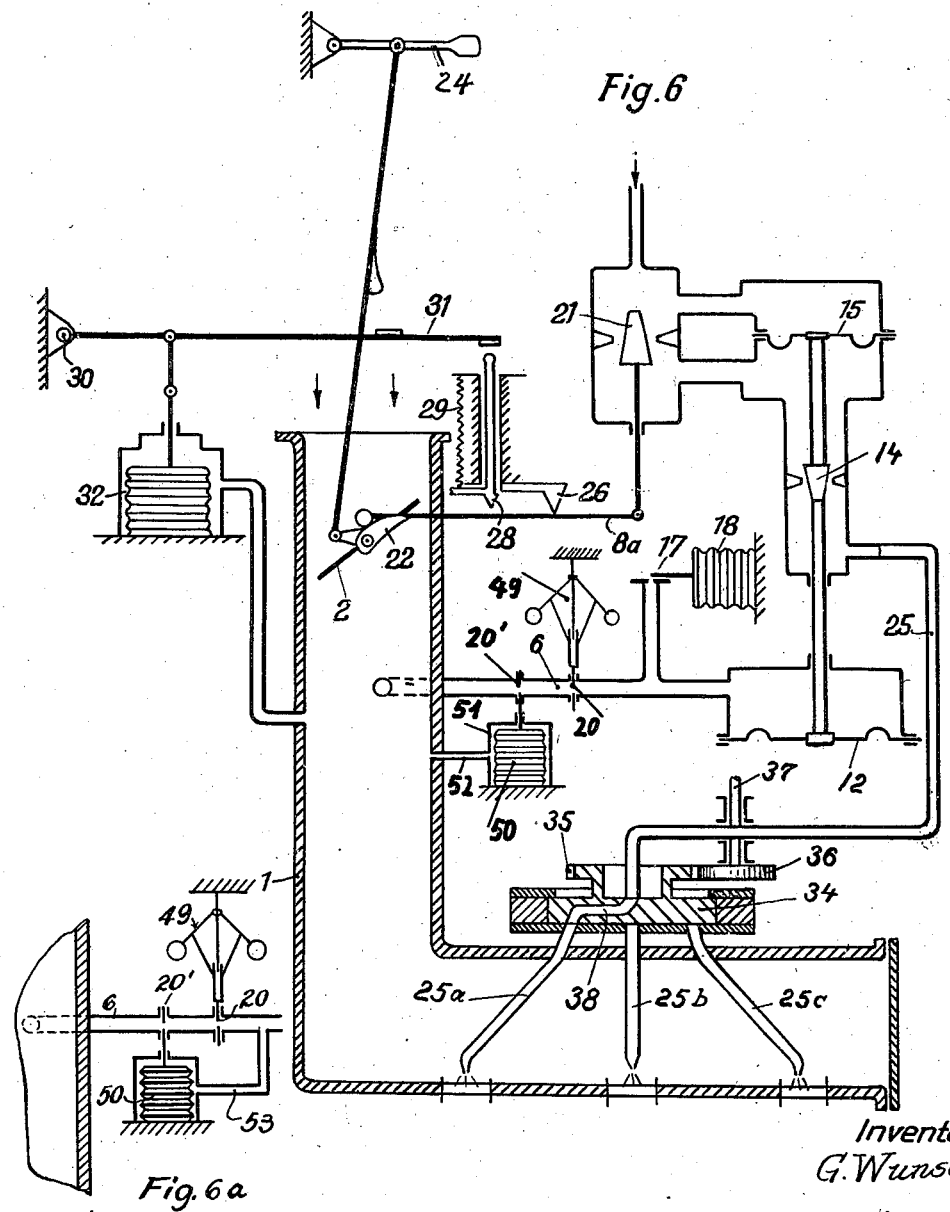

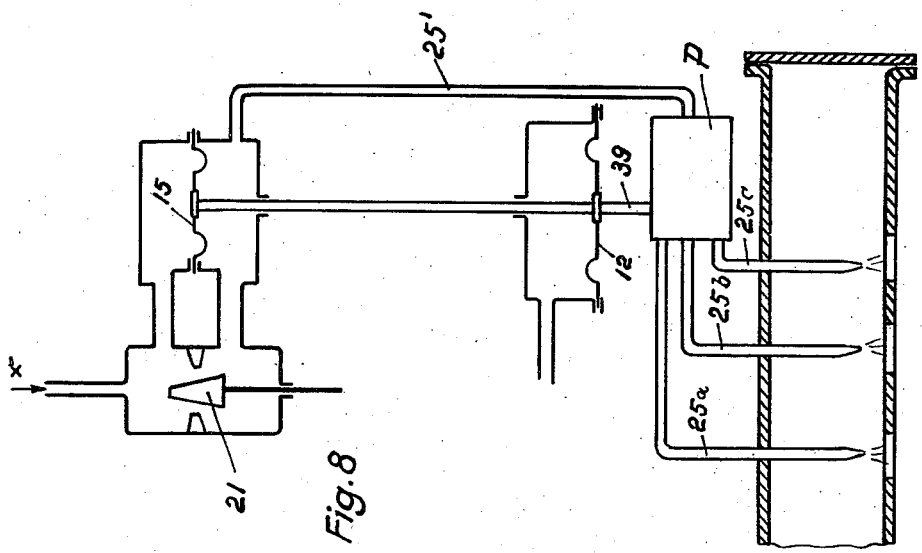
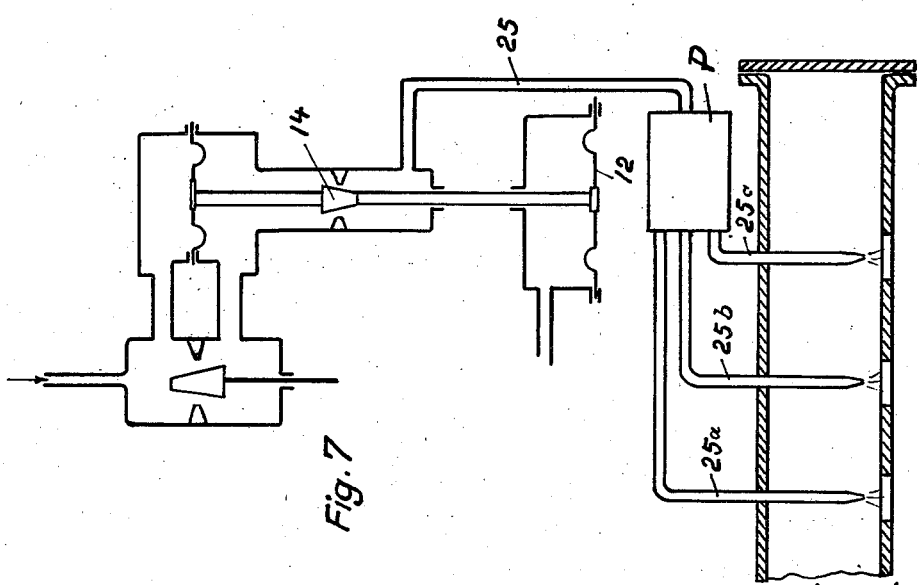

Patented Feb. 8, 1944

2,341,257

UNITED STATES PATENT OFFICE 2,341,257

FUEL FEEDING DEVICE FOR INTERNAL COMBUSTION ENGINES

Guido Wünsch, Berlin-Steglitz, Germany; vested in the Alien Property Custodian

Application December 5, 1938, Serial No. 244,127
In Germany December 1, 1937

17 Claims. (Cl. 123—140)

This invention relates to improvements in or relating to fuel feeding devices for internal combustion engines, more particularly for aircraft engines.

As is well known, the amount of fuel to be admitted to the combustion chamber of an internal combustion engine should be varied in response to the amount of air admitted to said combustion chamber in order to achieve perfect combustion. For this purpose, it is necessary to take into consideration besides the air volumes the condition of the air, i. e., the specific weight of the air which is dependent on the temperature and the pressure of the air.

The primary object of the invention is to provide a simple device for automatically controlling the amount of fuel in response to the exact amount or volume of air.

Other aims, objects and advantages of the subject matter of the invention will be more fully explained in the following description with reference to the accompanying drawings representing some embodiments of the invention.

In the drawings:

Fig. 1 is a diagrammatic view of the controlling device adapted to take into account the variations of the specific weight of air.

Fig. 2 is a diagrammatic view of the device of Fig. 1 for adjusting the controlling device in response to the specific weight of the air.

Fig. 4 is a part diagrammatic and part sectional view.

Fig. 5 is a side elevation of the cam and its cooperating parts of Fig. 5.

Fig. 6 is a part diagrammatic and part sectional view of a modification of the device shown in Fig. 3.

Fig. 6a is a diagrammatic view of a modification of the orifice control of Fig. 6.

Figs. 7, 8 and 9 are diagrammatic views with certain parts in section showing modified distributing means.

Figure 3:
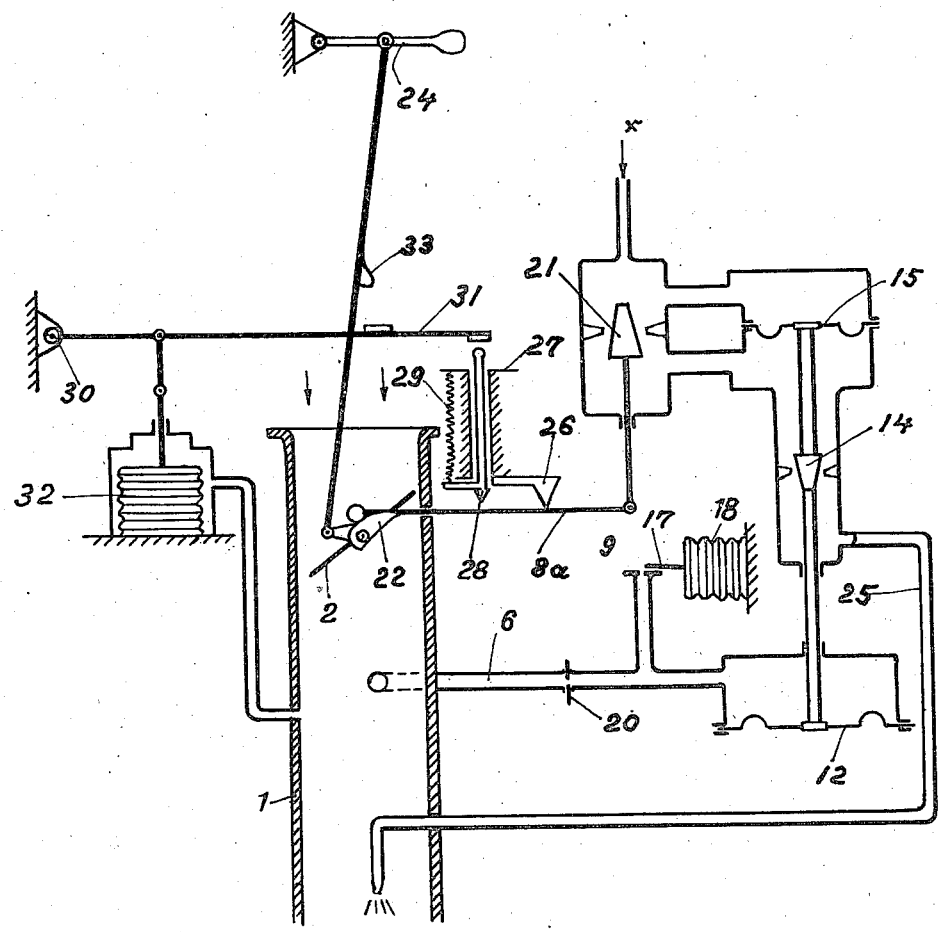
Fig. 3 is a diagrammatic view of a modified controlling device.
Figure 9:
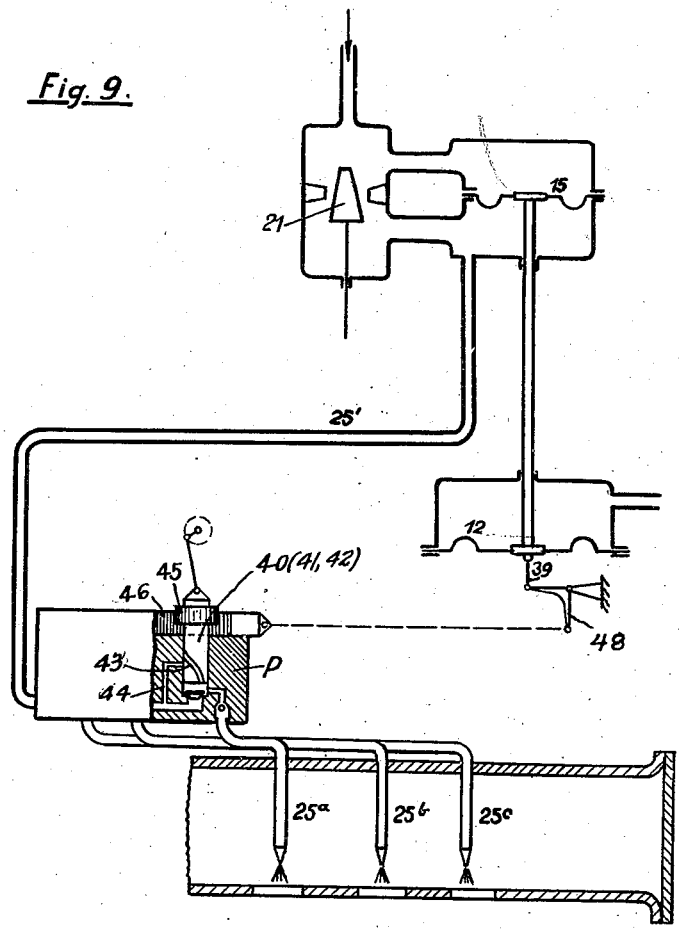

Referring now to Fig. 1:

The air intake manifold 1 is provided in the usual manner with the butterfly valve 2 which may be adjusted by means of a control rod 3. The air enters the manifold 1 in the direction of the arrow. The fuel is injected behind the valve 2 into the manifold 1 so as to produce a fuel-air mixture before entering the combustion chamber of the motor cylinder or cylinders. For obtaining an exact pressure difference, a conduit 6 is provided communicating with the interior of the intake manifold 1, the cross-section of the conduit being much smaller than that of the manifold 1 so that the amount of air flowing through the conduit 6 is likewise much smaller than the main quantity of air entering the manifold. The conduit 6 is provided with a valve 7 which may be of any desired type and construction. This valve 7 is connected, by means of a link 8, to the butterfly valve 2 so that upon any movement of the valve 2 the valve 7 will also be adjusted. Therefore, if the cross-sections of the valve openings 2 at different adjustments and of the valve 7 are proportional to each other, the amount of air flowing through the conduit 6 has a predetermined constant ratio to the entire amount of air entering the motor cylinder or cylinders. The air flow in conduit 6 is, therefore, an indication of the amount of air admitted to the motor.

The controlling pressure difference may be produced in a well known manner by means of a Venturi tube, orifice plate or the like. In the embodiment according to Fig. 1, an orifice plate 9 is provided at the air inlet opening of the conduit 6.

As shown in Fig. 1, the conduit 6 is enlarged at the inlet opening in order to reduce the differential pressure at the orifice plate 9, whereby this pressure will influence the flow at the valve 7 which is adjusted in accordance with the butterfly valve 2.

A controlling pressure conduit 10 is connected at one end to the conduit 6 behind the orifice plate 9 and at the other end to any suitable pressure responsive means. This means, in the embodiment according to Fig. 1, is a diaphragm casing 11 having a diaphragm 12 which is acted upon by the pressures existing behind and before the orifice plate 9. This diaphragm is connected to a fuel valve 14 which is in the fuel conduit 13. A second diaphragm 15 is also connected to the spindle of the valve 14 which is acted upon by a differential pressure responsive to the amount of fuel passing through an orifice plate 16 provided in the fuel conduit 13, the upper chamber of the diaphragm 15 communicating by means of a channel 16a with the fuel conduit 13 at a point in front of the orifice plate 16. As shown in Fig. 1, the arrangement is such that the fuel differential pressure acting on the diaphragm 15 and the air differential pressure acting on the diaphragm 12 operate in opposition to one another so that an equilibrium between the two diaphragms will exist only if the fuel differential pressure at the orifice plate 16 is proportional to the air pressure acting on the diaphragm 12. For this reason, the fuel valve 14 adjusts this fuel differential pressure so as to produce said equilibrium. In this respect, it is to be noted that the air pressure is proportional to the quadratic value of the air flow so that on the other hand the differential pressure at the fuel throttle 16 likewise varies quadratically with the amount of fuel. Thus, the air volume and the amount of fuel will be automatically controlled in a predetermined constant ratio.

The fuel controlled in this manner may be admitted into the air intake manifold 1 at any desired point. It is, of course, also possible to provide a fuel pump for feeding the fuel under pressure so as to atomize said fuel in the combustion air before the fuel-air mixture enters the combustion chamber of the engine.

In case it is desired to control the fuel, not only in response to the air volume, but also the air weight, the cross-section of the orifice plate 9 may be controlled in response to the specific weight of the air. For this purpose, according to the embodiment shown in Fig. 1, the orifice plate 9 is provided with a slide 17 which is adjusted in dependence on the specific weight, by means of a barometric bellows 18 connected to a lever 19, Fig. 2, which is linked to said slide.

The main principle of the invention is shown in Fig. 1. The purpose of the invention is to proportion the amount of fuel to a combustion engine relative to the amount of air.

The difficulty in measuring the flow of air to an internal combustion engine is that the pulsations of the air flow make it very difficult to measure the air flow directly by means of an orifice plate in the air duct leading to the engine. In order to solve this problem and to obtain average air flow values in spite of the pulsations it was found satisfactory to provide a small branch line through which air is sucked into the main conduit or intake manifold. Due to the smaller size of this line a much more uniform flow of air is obtained and it is therefore possible to control the air flow in the branch line to represent the air flow in the main conduit. The flow of fuel as shown in Fig. 1 is measured by the fixed orifice plate 16 in the fuel line 13 in the usual manner. The differential pressure across this orifice plate is an indication of the rate of fuel flow.

In order to obtain proportional flow of air through the main conduit and through the branch line, one must consider the butterfly valve 2 for any given position as a fixed restriction which, as shown in Fig. 1, is connected to the needle valve 7 in the branch line. As the pressure ahead of the butterfly valve 2 and the pressure ahead of the air intake in the branch line is the same and the pressure behind the butterfly valve 2 and the pressure behind the needle valve 7 is the common pressure on the downstream side of the butterfly valve 2 the two flows through the main conduit 1 and through the branch conduit 6 are directly proportional as they depend only on the opening at the restriction and on the common differential pressure. In order to have the same relation between the two flows for different rates of flow of air through the main conduit, the position and shape of the needle valve 7 is so designed that direct proportion is obtained for any one condition within the operating range of the engine. It will be noted from Fig. 1 that the restriction in the branch line 6 is actually a combination of two restrictions 7 and 9. It is customary and known in the art to substitute two or more restrictions for one single restriction without changing the square root relation between flow and pressure drop. In order to measure the rate of flow of air through the branch line 6 which, as pointed out above, can be made directly proportional to the flow through the main conduit 1, the pressure drop across the first orifice 9 is taken and applied to the diaphragm 12. Fig. 1 shows only one connection 10 instead of the customary two because the pressure ahead of the orifice 9 is equal to the barometric pressure and therefore no connection is necessary as the same barometric pressure acts on the other side of the diaphragm 12.

If the differential pressure in the air line should be modified in order to coact for variation in density, it is possible to change the size of the inlet opening 9 as shown in Fig. 2. The bellows 18, filled with vapor at a predetermined condition, changes the size of the air inlet 9 by operating the vane 17 by means of the double lever 19. Increase in barometric pressure compresses the bellows 18 and decreases the opening, thus giving a higher differential pressure for the same rate of flow. A change of temperature expands the bellows 18 and opens the intake, thus giving a lower differential pressure for the same rate of flow. Thus the rate of flow of fuel is correspondingly increased and decreased respectively.

It is possible to maintain automatically the correct ratio between the fuel and air if the air impulse obtained from the orifice 9 is applied to a diaphragm and the force exerted on this diaphragm counterbalanced by the force exerted by the differential pressure across the restriction in the fuel line. This is done, as shown in Fig. 1, by controlling the position of the needle valve 14 in the fuel line directly in response to the unbalance between the force on the two diaphragms. If, for instance, the fuel flow is too great, the needle valve 14 will decrease the valve opening until the differential pressure across the restriction 16 again balances the suction above the diaphragm 12.

The next major step to arrive at the final solution as shown in Figs. 3 to 9, is the realization that the restriction 7 can be made constant if at the same time the restriction 16 is made variable. This is evident if one realizes that with the constant restriction 7 the ratio of the air flow through the branch line 7 will not any longer be directly proportional to the main flow through the conduit 1. However, there will be a definite relation between these two flows for different differential pressures.

In order to obtain the correct ratio between the fuel and air, it is therefore necessary to modify the pressure differential obtained across the restriction in the fuel line in such a way that balancing the differential pressure across the variable restriction in the fuel line against the suction behind the intake orifice 9 in the branch line will still give a right proportion between the total amount of fuel and the total amount of air. This solution has the further advantage that it provides a safety feature insofar as even in case of a failure of the ratio diaphragm valve an adjustment of the air throttle immediately makes a correction of the fuel flow due to the fact that the variable restriction 16 acts similar to the butterfly valve 2 in the air intake 1 in reducing or increasing the corresponding flows due to the mechanical connection between them. The ratio control in such an arrangement will only slightly modify the flow of fuel to obtain the proportion exactly right which has been proportioned by the position of the two restrictions.

Fig. 3 shows the actual lay-out with this modification.

In Fig. 3 the parts already shown in Figs. 1 and 2 have the same reference numerals and need not, therefore, be referred to. It is evident that the ratio between the variable restriction in the fuel line and the position of the butterfly inlet in the air duct has to follow a definite relation and this is mechanically accomplished by providing a cam 22 and the corresponding shape of the variable restriction 21. The differential pressure across the variable restriction 21 is applied on the diaphragm 15 and balanced against the suction behind the orifice 9 which acts on diaphragm 12. The unbalance between the force of the diaphragm responding to the air flow controls the control needle valve 14 which in turn controls the fuel flow. Variations in barometric air pressure and/or temperature are controlled by bellows 18 as previously shown. It will be noted that orifice 20 in Fig. 3 which replaces the variable orifice 7 in Fig. 1 is a fixed restriction. It has to be noted that in case a supercharger is being used connection should exist between the extreme side of orifice 9 and the upstream side of butterfly 2 and a second connection from the upstream side should be applied to the other side of diaphragm 12.

It has been found desirable with engines of this type to have a richer mixture of fuel and air if the engine is overloaded. In order to obtain this automatically a bellows 32 is provided which in case of an increase in pressure in the intake manifold 1 changes the fulcrum of the lever 8a by depressing the fulcrum pin 28 which takes the place of the pivot point or fulcrum 26. As the new pivot 28 in Fig. 3 is on the left hand side of pivot 26 the variable orifice 21 will open further for the same movement of the butterfly 2. This means a larger free opening in the variable orifice and therefore an increase in fuel flow in order to obtain the same differential pressure across it. This, however, means increase in the fuel to air ratio as desired. In Fig. 3, it is shown that the hand adjustment of the butterfly (lever 24) is mechanically connected in such a way that this variable fulcrum 28 comes into play also if the throttle lever 24 is brought into wide open position. This means that even under these circumstances, the fuel flow is being increased and the mixture enriched.

For the automatic control of the support 28 the following means are provided:

A lever 31 which is pivotally mounted as at 30 is connected to a well known booster pressure bellows 32, the casing of which communicates with the intake manifold so that the bellows 32 operates in accordance with the variation of the booster pressure in the intake manifold. As soon as the booster pressure exceeds a predetermined value, the bellows 32 rocks the lever 31 in a clockwise direction, i. e., downwardly so that the support 28 engages the lever 8a and rocks it in a clockwise direction about the cam 22 so that the fuel valve 21 will be further opened and thus the air mixture enriched.

The link system connecting the hand lever 24 with the butterfly valve 2 is provided with an abutment 33 which is so arranged that it engages the lever 31 in the range of the end positions of the lever 24 so that, by means of the lever 31, the support 28 becomes effective and changes the transmission ratio of the lever 8a. As soon as the lever 24 approaches its end position, thus completely opening the throttle, the fuel valve 21 will be additionally opened so as to enrich the fuel-air mixture for preventing the engine from becoming overheated.

If necessary, it is possible to extend the conduit 6 beyond the orifice plate 9 and to connect the extension with the intake manifold 1 in front of the butterfly valve 2. This is desirable in case air heaters, dust filters or the like are provided in the airstream in front of the butterfly valve 2.

Fig. 4 shows in a more detailed manner the device according to Fig. 3, corresponding parts having the same reference numerals. Fig. 4 shows actual design of the apparatus as disclosed in Fig. 3, the variable orifice valve 21 being operated mechanically from a movement of the butterfly valve 2 and the correct relation between the size of this orifice 21 and the position of the butterfly valve 2 is maintained or assured by a corresponding cam slide, as shown in Fig. 5. In this instance, the cam is separated from the butterfly valve and operates the stem of the valve directly, the stem being screw threaded in its casing. A housing 18a is connected to the conduit 6 which enclose the barometric bellows 18 corresponding to the orifice plate 9 in Fig. 3. The valve rod 17a controlling the throttle opening 9a is connected to the bellows 18 and is formed to correspond with the root value of the specific weight for the purpose explained above. Apertures 18b provided in the housing permit the air to enter the housing and flow past the bellows 18 before entering the throttle opening 9a.

The diaphragm 12 is acted upon on its upper side by the air pressure which is present behind the throttle opening 9a, while on the lower side there is atmospheric pressure. The diaphragms 12 and 15 are interconnected by means of a wire w to which is fastened the valve 14 for controlling the fuel amount in response to the air differential pressure. The fuel flows by the valve 21 before reaching the valve 14, as indicated by the dotted line, so that the pressure on the lower side of the diaphragm 15 equals the pressure behind the throttle valve 21. The chamber on the upper side of the diaphragm 15 communicates, by means of a channel c, with the fuel feeding conduit in front of the valve 21. This will be controlled dependent on the butterfly valve 2 in any convenient manner. The spindle 21a of the valve 21 has a screw-threaded portion engaging a screw-threaded nut for axially displacing the valve 21 upon rotation of the spindle 21a. An actuating crank r is fastened to the spindle and this crank is connected to the butterfly valve 2 by means of any suitable link system schematically shown at 8a, 22d, 22c, 22, 22b.

The cam 22 of Fig. 3 is pivotally arranged, in Figs. 4 and 5, at 22a near the valve 21 on the housing thereof and comprises a curved slot 22b engaged by the pin p which forms a part of the crank r. A lever 22c is rigidly connected to the cam 22 and is linked to a lever transmission system as schematically shown in Figs. 4 and 5.

In the construction shown in Figs. 3 and 4 the fuel flowing through the conduit 25 enters the intake manifold 1 before the latter branches off to the different cylinders, in the case of a multicylinder engine so that the fuel-air mixture is produced in the manifold communicating with the several cylinders. The inventive idea may, however, also be utilized in connection with a motor in which the fuel will be separately admitted to the different cylinders or groups of cylinders.

Figs. 6 to 9 show a number of embodiments of this type. Fig. 6 is applicable to a motor comprising six cylinders, of which two cylinders are combined in each group, since these two cylinders have a suitable induction phase. Therefore, the main fuel conduit 25 communicates with three branch conduits 25a, 25b, 25c, a rotating distributor 34, Fig. 6, being provided for successively connecting the branch conduits to the main conduit 25. The distributor 34 comprises a disc having a toothed gear 35 meshing with a second gear 36 driven by a shaft 37 which is coupled with the motor shaft (not shown), in any convenient manner. In this way, the distributor disc or valve 34 synchronously rotates with the motor shaft, as is necessary for a correct distribution of the amount of fuel admitted to the main conduit among the three branch conduits. As will be seen from Fig. 6, a channel 38 in the distributor disc valve 34 rotates upon rotation of the disc so as to successively connect the three branch conduits to the main conduit 25. If the number of cylinders is so great that the fuel injection phases of the different cylinders are superposed, a plurality of distributors should preferably be provided and possibly likewise a plurality of controlling devices.

It is noted that the orifice plate 20 in the conduit 6 may be adjusted dependent on the amount of air or the absolute pressure in the intake manifold or at least on the number of revolutions of the motor shaft.

It was pointed out that an orifice can always be replaced by a series of restrictions the pressure drop across which can be made equal to the pressure drop across the single orifice. This being the case, it is possible to replace orifice 20 in Figs. 3 and 4 by two orifice plates 20 and 20' which can be varied in size depending upon other variables, such as speed of the engine and/or absolute pressure in the intake manifold. As shown in Fig. 6, the orifice plate 20 will be adjusted by means of a centrifugal governor 49. If the fuel-air mixture should be influenced in accordance with the absolute pressure in the intake manifold, the orifice plate 20' instead of the plate 20 will be adjusted by means of a bellows 50, surrounded by a casing 51 which communicates, by means of a conduit 52, with the intake manifold 1. The centrifugal governor 49 changes the orifice 20 so that the pressure drop becomes a function of the speed, the bellows 50 responding to the absolute pressure in the intake manifold which changes orifice 20' to modify the differential pressure in accordance with absolute pressure conditions in the intake manifold.

In order to influence the fuel-air mixture in accordance with the amount of air, the conduit 52 is dispensed with and the housing 51 is connected to the conduit 6 by means of a conduit 53 as indicated in Fig. 6a.

According to the modification shown in Fig. 7, the three branch conduits 25a, 25b and 25c are provided with a pump P in the fuel line, the suction pipe of which is connected to the main fuel conduit 25 so that the valve 14, controlled in accordance with the air flow, determines the amount of fuel entering the pump at its suction or intake side. The pump may always operate with full strokes, since the admission will be automatically controlled by means of the air and fuel pressure responsive devices.

Instead of the valve 14, the stroke of the fuel pump P may be controlled by variable delivery mechanism, Fig. 8, which controls the delivery of the fuel pump in such a way that the fuel differential pressure still balances the air impulse. In this instance, the variable delivery is effected by the rod 39 which may be connected to variable gears or to an eccentric in the usual manner. In such a case, the throttle 14 may be dispensed with. The rod 39 connected to the diaphragm 12 acts upon the stroke adjusting means of the pump P. In this embodiment, the amount of fuel flowing through the main conduit 25' is not directly controlled in response to the air flow so that the pump P may draw in any uncontrolled amount of fuel. By adjusting the stroke of the pump, the amount of fuel admitted to the branch conduits 25a, 25b and 25c will be controlled in response to the controlling impulse acting on the diaphragm 12.

The pump P, having an adjustable stroke, may be of any convenient well known construction. In the embodiment shown in Fig. 9, the piston-type pump P has a variable capacity and comprises three plungers 40, 41 and 42, each of said plungers having a helical channel 43 adapted to connect the pump cylinder to a channel 44 communicating with the main fuel conduit 25'. Upon rotation of the plunger around the cylinder axis, the effective stroke will be varied. If, for instance, the plunger 40 is rotated towards the left, the effective stroke will be decreased, for the reason that, by the left hand rotation, the screw-like channel 43 communicates earlier with the channel 44 than upon right hand rotation of the plunger.

Each of the three plungers 40, 41 and 42 is provided with a pinion 45 meshing with a rack 46. This rack is connected by means of a bell crank lever 48 to the adjusting rod 39. The connecting rod 39 thus changes the relative position of the by-pass shown in the reciprocating piston and thus controls the delivery of the pump. The rack 46 will be displaced in response to the air flow and, therefore, the effective stroke of the plungers 40, 41 and 42 will be correspondingly varied.

Although I have illustrated my invention in connection with some special embodiments, it will be apparent that the inventive idea is not restricted to the embodiments shown and described. Of course, many more modifications of these embodiments may be made without departing from the spirit of my invention, as defined in the appended claims.

I claim as my invention:

1. In a fuel-air feeding device for an internal combustion engine, more particularly for aircraft engines, the combination with an air intake manifold with a throttle means, and a fuel conduit, of a controlling device comprising an auxiliary air intake conduit, one end of which is in communication with the manifold downstream of the air throttle means, means responsive to the air flow through said auxiliary conduit, and fuel controlling means including a differential pressure device responsive to the amount of fuel flow and connected to be operated by said air flow responsive means in response to said auxiliary air flow.

2. In a fuel-air feeding device for an internal combustion engine, more particularly for aircraft engines, the combination with an air intake manifold with a throttle means, and fuel conduit, of a controlling device comprising an auxiliary air intake conduit, one end of which is in communication with the manifold downstream of the air throttle means and the other end being open to the atmosphere, means responsive to the auxiliary air flow, and fuel controlling means including a differential pressure device responsive to fuel flow and connected to be operated by said air flow responsive means in response to said auxiliary air flow.

3. In a fuel-air feeding device for an internal combustion engine, more particularly for aircraft engines, the combination with an air intake manifold with a throttle means, and a fuel conduit, of a controlling device comprising an auxiliary air intake conduit, one end of which is in communication with the manifold downstream of the air throttle means, means responsive to the air weight flowing per unit of time through said auxiliary conduit, and fuel controlling means including a differential pressure device responsive to the amount of fuel flow and connected to be operated by said air weight responsive means in response to said auxiliary air flow.

4. In a fuel-air feeding device for an internal combustion engine, more particularly for aircraft engines, the combination with an air intake manifold with a throttle means, and a fuel conduit, of a controlling device comprising an auxiliary air intake conduit, one end of which is in communication with the manifold downstream of the air throttle means, means responsive to the velocity of the air flowing through said auxiliary conduit, means responsive to variations of the specific weight of air for modifying said velocity responsive means, and fuel controlling means including a differential pressure device responsive to the amount of fuel flow and connected to be operated by said velocity responsive means in response to said auxiliary air flow.

5. In a fuel-air feeding device for an internal combustion engine, more particularly for aircraft engines, the combination with an air intake manifold with a throttle means, and a fuel conduit, of a controlling device comprising an auxiliary air intake conduit one end of which is in communication with the manifold downstream of the air throttle means, means responsive to the velocity of the air flowing through said auxiliary conduit, means responsive to variations of the specific weight of the air, a variable throttle in said auxiliary conduit connected to be adjusted by said last means in response to the specific weight of the air, and fuel controlling means including a differential pressure device responsive to fuel flow and connected to be operated by said velocity responsive means.

6. In a fuel-air feeding device for an internal combustion engine, more particularly for aircraft engines, the combination with an air intake manifold and a fuel conduit, of a controlling device comprising an auxiliary air intake conduit, one end of which is in communication with the manifold and the other end being open to the atmosphere, correcting means responsive to variations of the specific weight of the air, a variable throttle in said auxiliary conduit connected to be acted upon by said correcting means so as to adjust the throttle opening in accordance with the root value of the specific weight of the air, means responsive to the velocity of the variable air flow behind said throttle, and fuel controlling means connected to be operated by said velocity responsive means in accordance with the air rate flowing per unit of time through said auxiliary throttle.

7. In a fuel-air feeding device for an internal combustion engine, more particularly for aircraft engines, the combination with an air intake manifold and a fuel conduit, of a controlling device comprising an auxiliary air intake conduit, one end of which is in communication with the manifold and the other end being open to the atmosphere, correcting means responsive to variations of the specific weight of the air, a variable throttle opening in said auxiliary conduit, the contour of the opening of said throttle forming a hyperbolic curve, a gate valve cooperating with said opening and connected to be displaced by said correcting means so as to vary the throttle opening due to the hyperbolic contour proportional to the root value of the specific weight of the air flowing through said throttle opening, means responsive to the velocity of the variable air flow behind said throttle, and fuel controlling means connected to be operated by said velocity responsive means in accordance with the air rate flowing per unit of time through said auxiliary throttle.

8. In a fuel air feeding device for an internal combustion engine, more particularly for aircraft engines, the combination with an air intake manifold and a fuel conduit, of a controlling device comprising an auxiliary air intake conduit, one end of which is in communication with the manifold and the other end being open to the atmosphere, valve means in said main conduit for controlling the air flow in the manifold, a second valve means in said auxiliary conduit connected to be controlled by said first named valve means, means responsive to the air flow through said auxiliary conduit, and fuel controlling means including a differential pressure device responsive to the amount of fuel flow and connected to be operated by said air flow responsive means in response to said auxiliary air flow.

9. In a fuel-air intake device for an internal combustion engine, more particularly for aircraft engines, the combination with an air intake manifold and a fuel conduit, of a controlling device comprising an auxiliary air intake conduit, one end of which is in communication with the manifold, throttle means in said manifold for controlling the air flow therethrough, said auxiliary air intake conduit being connected to said manifold downstream of said throttle valve, valve means in said fuel conduit connected to be controlled by said throttle means, means responsive to the air flow through said auxiliary conduit, and fuel controlling means including a differential pressure device responsive to fuel flow and connected to be operated by said air flow responsive means in response to said auxiliary air flow.

10. In a fuel-air intake device for an internal combustion engine, more particularly for aircraft engines, the combination of an air intake manifold and a fuel conduit, of a controlling device comprising an auxiliary air intake conduit one end of which is in communication with the manifold and the other end being open to the atmosphere, throttle means in said auxiliary conduit, pressure responsive means connected to be acted upon by the differential pressure at said throttle means, a throttle means in said fuel conduit, a second pressure responsive means connected to be acted upon by the differential pressure at said fuel throttle means, and fuel controlling means connected to be operated in response to the difference between the air differential pressure and the fuel differential pressure.

11. In a fuel-air intake device for an internal combustion engine, more particularly for aircraft engines, the combination with an air intake manifold and a fuel conduit, of a controlling device comprising an auxiliary air intake conduit, one end of which is in communication with the manifold and the other end being open to the atmosphere, throttle means in said manifold for controlling the air flow therethrough, valve means in said fuel conduit connected to be controlled by said throttle means, means for varying the transmission ratio between said throttle means and said valve means, means responsive to the air flow through said auxiliary conduit, and fuel controlling means connected to be operated by said air flow responsive means.

12. In a fuel-air feeding device for an internal combustion engine including at least two cylinders, more particularly for aircraft engines, the combination with an air intake manifold for admitting air to all the cylinders, of a controlling device comprising an auxiliary air intake conduit, one end of which is in communication with the manifold and the other end being open to the atmosphere, a fuel supply line, means responsive to the air flow through said auxiliary conduit and connected to a differential pressure device in the fuel line, a fuel feeding pump connected to the fuel line including a feeding piston for each of said cylinders, and means connected to be controlled by said air flow responsive means for varying the amount of fuel delivered by the pump in response to said auxiliary air flow.

13. In a fuel-air feeding device for an internal combustion engine including at least two cylinders, more particularly for aircraft engines, the combination with an air intake manifold for admitting air to all the cylinders, of a controlling device comprising an auxiliary air intake conduit, one end of which is in communication with the manifold and the other end being open to the atmosphere, means responsive to the air flow through said auxiliary conduit, a fuel feeding pump including a feeding piston for each of said cylinders, and fuel controlling means arranged in said fuel conduit in front of said pump, said fuel controlilng means including a differential pressure device responsive to the amount of fuel flow and being connected to be operated by said air flow responsive means in response to said auxiliary air flow.

14. In a fuel-air feeding device for an internal combustion engine including at least two cylinders, more particularly for aircraft engines, the combination with an air intake manifold for admitting air to all the cylinders, of a controlling device comprising an auxiliary air intake conduit, one end of which is in communication with the manifold and the other end being open to the atmosphere, means responsive to the air flow through said auxiliary conduit, a fuel feeding pump including a feeding piston for each of said cylinders and means including a differential pressure device responsive to the amount of fuel flow and connected to be controlled by said air flow responsive means for varying the effective piston stroke in response to said auxiliary air flow.

15. In a fuel-air feeding device for an internal combustion engine, more particularly for aircraft engines, the combination with an air intake manifold with a throttle means, and a fuel conduit, of a controlling device comprising an auxiliary air intake conduit, one end of which is in communication with the manifold downstream of the air throttle means, means responsive to the air flow through said auxiliary conduit, fuel controlling means connected to be operated by said air flow responsive means in response to said auxiliary air flow, and variable throttle means in said auxiliary conduit connected to be controlled by said air flow responsive means.

16. In a fuel-air feeding device for an internal combustion engine, more particularly for aircraft engines, the combination with an air intake manifold with a throttle means, and a fuel conduit, of a controlling device comprising an auxiliary air intake conduit, one end of which is in communication with the manifold downstream of the air throttle means and the other end subjected to the same conditions as those in the manifold, means responsive to the air flow through said auxiliary conduit, and fuel controlling means including a differential pressure device responsive to the amount of fuel flow and connected to be operated by said air flow responsive means in response to said auxiliary air flow.

17. In a fuel-air feeding device for an internal combustion engine, more particularly for aircraft engines, the combination with an air intake manifold and a fuel conduit, of a controlling device, comprising an auxiliary air intake conduit, one end of which is in communication with the manifold, fuel controlling means, and an impulse system for operating said controlling means, said impulse system including means responsive to the rate of air flow in said auxiliary conduit and counteracting means responsive to the rate of fuel flow in said fuel conduit, variable throttle means in said auxiliary conduit, and means responsive to the number of revolutions of the engine connected to control said variable throttle means.

GUIDO WÜNSCH.